United States Patent
Sethuraman et al.

(10) Patent No.: US 10,057,110 B2
(45) Date of Patent: Aug. 21, 2018

(54) SITE MANAGEMENT SYSTEM WITH DYNAMIC SITE THREAT LEVEL BASED ON GEO-LOCATION DATA

(71) Applicant: Honeywell International Inc., Morris Plains, NJ (US)

(72) Inventors: Rajeshkumar Thappali Ramaswamy Sethuraman, Maduri (IN); MuthuRamji Vadamalayan, Chennai (IN); Viswanathan Krishnan, Madurai (IN)

(73) Assignee: Honeywell International Inc., Morris Plains, NJ (US)

( * ) Notice: Subject to any disclaimer, the term of this patent is extended or adjusted under 35 U.S.C. 154(b) by 286 days.

(21) Appl. No.: 14/934,543

(22) Filed: Nov. 6, 2015

(65) Prior Publication Data
US 2017/0134214 A1 May 11, 2017

(51) Int. Cl.
| | |
|---|---|
| *H04W 4/021* | (2018.01) |
| *H04W 4/02* | (2018.01) |
| *H04L 1/00* | (2006.01) |
| *H04L 12/24* | (2006.01) |
| *H04B 1/3822* | (2015.01) |
| *H04W 4/70* | (2018.01) |
| *G01S 1/00* | (2006.01) |

(52) U.S. Cl.
CPC ............ *H04L 41/0609* (2013.01); *G01S 1/00* (2013.01); *H04B 1/3822* (2013.01); *H04L 41/22* (2013.01); *H04W 4/021* (2013.01); *H04W 4/023* (2013.01); *H04W 4/70* (2018.02)

(58) Field of Classification Search
None
See application file for complete search history.

(56) References Cited

U.S. PATENT DOCUMENTS

| | | |
|---|---|---|
| 6,255,988 B1 | 7/2001 | Bischoff |
| 6,356,282 B2 | 3/2002 | Roytman et al. |
| (Continued) | | |

FOREIGN PATENT DOCUMENTS

| | | |
|---|---|---|
| AU | 2015201441 A1 | 3/2015 |
| CN | 101689327 | 5/2013 |
| (Continued) | | |

OTHER PUBLICATIONS

Balaji et al., "Sentinel: Occupancy Based HVAC Actuation Using Existing WiFi Infrastructure Within Commercial Buildings," SenSys '13, 14 pages, Nov. 11-15, 2015.

(Continued)

*Primary Examiner* — Philip Chea
*Assistant Examiner* — Hassan Khan
(74) *Attorney, Agent, or Firm* — Seager Tufte & Wickhem LLP

(57) ABSTRACT

A site management system may include a user interface with a display device, a network interface, and a controller coupled to the user interface and the network interface. In some examples, the controller may be configured to determine the location of a first machine and compare the location of the first machine to one or more second machines. After determining the first machine crosses a predetermined geo-boundary of a second machine, the controller may be configured to elevate a threat level associated with the second machine.

7 Claims, 9 Drawing Sheets

(56) References Cited

U.S. PATENT DOCUMENTS

| | | |
|---|---|---|
| 6,400,956 B1 | 6/2002 | Richton |
| 6,478,233 B1 | 11/2002 | Shah |
| 6,529,137 B1 | 3/2003 | Roe |
| 6,604,023 B1 | 8/2003 | Brown et al. |
| 6,665,613 B2 | 12/2003 | Duvall |
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,614,567 B2 | 11/2009 | Chapman et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,839,275 B2 | 11/2010 | Spalink et al. |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,064,935 B2 | 11/2011 | Shamoon et al. |
| 8,065,342 B1 | 11/2011 | Borg et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,301,765 B2 | 10/2012 | Goodman |
| 8,332,055 B2 | 12/2012 | Veillette |
| 8,350,697 B2 | 1/2013 | Trundle et al. |
| 8,386,082 B2 | 2/2013 | Oswald |
| 8,390,473 B2 | 3/2013 | Kryzanowski et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,531,294 B2 | 9/2013 | Slavin et al. |
| 8,554,374 B2 | 10/2013 | Lunacek et al. |
| 8,554,714 B2 | 10/2013 | Raymond et al. |
| 8,560,127 B2 | 10/2013 | Leen et al. |
| 8,571,518 B2 | 10/2013 | Imes et al. |
| 8,587,445 B2 | 11/2013 | Rockwell |
| 8,620,841 B1 | 12/2013 | Filson et al. |
| 8,626,344 B2 | 1/2014 | Imes et al. |
| 8,630,741 B1 | 1/2014 | Matsuoka et al. |
| 8,648,706 B2 | 2/2014 | Ranjun et al. |
| 8,670,783 B2 | 3/2014 | Klein |
| 8,686,841 B2 | 4/2014 | Macheca et al. |
| 8,718,826 B2 | 5/2014 | Ramachandran et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 8,965,406 B2 | 2/2015 | Henderson |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,247,378 B2 | 1/2016 | Bisson et al. |
| 9,280,559 B1 | 3/2016 | Jones |
| 9,288,620 B2 | 3/2016 | Menendez |
| 9,363,638 B1 | 3/2016 | Jones |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,772 B2 | 6/2016 | Burks |
| 9,396,344 B1 | 7/2016 | Jones |
| 9,414,422 B2 | 8/2016 | Belghoul et al. |
| 9,433,681 B2 | 9/2016 | Constien et al. |
| 9,449,491 B2 | 9/2016 | Sager et al. |
| 9,491,577 B1 | 11/2016 | Jones |
| 9,589,435 B2 | 3/2017 | Finlow-Bates |
| 9,635,500 B1 | 4/2017 | Becker et al. |
| 9,645,589 B2 | 5/2017 | Leen et al. |
| 2002/0147006 A1 | 10/2002 | Coon et al. |
| 2005/0156715 A1* | 7/2005 | Zou ............... B60R 25/1025 |
| | | 340/426.19 |
| 2005/0172056 A1 | 8/2005 | Ahn |
| 2006/0063522 A1 | 3/2006 | McFarland |
| 2006/0097063 A1 | 5/2006 | Zeevi |
| 2007/0037605 A1 | 2/2007 | Logan |
| 2007/0099626 A1 | 5/2007 | Lawrence et al. |
| 2007/0114295 A1 | 5/2007 | Jenkins |
| 2007/0249319 A1 | 10/2007 | Faulkner et al. |
| 2008/0094230 A1 | 4/2008 | Mock et al. |
| 2008/0125965 A1* | 5/2008 | Carani .................. G07C 5/008 |
| | | 701/408 |
| 2008/0136636 A1* | 6/2008 | Forrest ............... G08B 13/2402 |
| | | 340/572.1 |
| 2010/0034386 A1 | 2/2010 | Choong et al. |
| 2010/0042940 A1 | 2/2010 | Monday et al. |
| 2010/0081375 A1 | 4/2010 | Rosenblatt et al. |
| 2010/0127854 A1 | 5/2010 | Helvick et al. |
| 2010/0156628 A1 | 6/2010 | Ainsbury et al. |
| 2010/0261465 A1 | 10/2010 | Rhoads et al. |
| 2011/0153525 A1 | 6/2011 | Benco et al. |
| 2012/0161971 A1* | 6/2012 | Nasir .................. G07C 1/10 |
| | | 340/573.4 |
| 2012/0172027 A1 | 7/2012 | Partheesh et al. |
| 2012/0191257 A1 | 7/2012 | Corcoran et al. |
| 2012/0209730 A1 | 8/2012 | Garrett |
| 2012/0259466 A1 | 10/2012 | Ray et al. |
| 2012/0259537 A1* | 10/2012 | Schmidt ................ A01B 69/00 |
| | | 701/300 |
| 2012/0284769 A1* | 11/2012 | Dixon .................. H04W 4/021 |
| | | 726/1 |
| 2013/0073094 A1 | 3/2013 | Knapton et al. |
| 2013/0204441 A1 | 8/2013 | Sloo et al. |
| 2013/0225196 A1 | 8/2013 | James et al. |
| 2013/0231137 A1 | 9/2013 | Hugie et al. |
| 2013/0310053 A1 | 11/2013 | Srivastava et al. |
| 2013/0318217 A1 | 11/2013 | Imes et al. |
| 2013/0331087 A1 | 12/2013 | Shoemaker et al. |
| 2014/0031989 A1 | 1/2014 | Bergman et al. |
| 2014/0031991 A1 | 1/2014 | Bergman et al. |
| 2014/0100835 A1 | 4/2014 | Majumdar et al. |
| 2014/0156087 A1 | 6/2014 | Amundson |
| 2014/0164118 A1 | 6/2014 | Polachi |
| 2014/0172176 A1 | 6/2014 | Deilmann et al. |

(56) References Cited

U.S. PATENT DOCUMENTS

| | | |
|---|---|---|
| 2014/0200718 A1 | 7/2014 | Tessier |
| 2014/0244048 A1 | 8/2014 | Ramachandran et al. |
| 2014/0266635 A1 | 9/2014 | Roth et al. |
| 2014/0277762 A1 | 9/2014 | Drew |
| 2014/0302879 A1 | 10/2014 | Kim et al. |
| 2014/0330435 A1 | 11/2014 | Stoner et al. |
| 2014/0337123 A1 | 11/2014 | Neurenberg et al. |
| 2014/0349672 A1 | 11/2014 | Kern et al. |
| 2014/0370911 A1 | 12/2014 | Gorgenyi et al. |
| 2015/0048941 A1* | 2/2015 | Wagner ............... G06Q 10/06 340/539.13 |
| 2015/0065161 A1 | 3/2015 | Ganesh et al. |
| 2015/0094860 A1 | 4/2015 | Finnerty et al. |
| 2015/0111524 A1* | 4/2015 | South .................. H04W 4/90 455/404.2 |
| 2015/0140994 A1 | 5/2015 | Partheesh et al. |
| 2015/0141045 A1 | 5/2015 | Qiu et al. |
| 2015/0159895 A1 | 6/2015 | Quam et al. |
| 2015/0163631 A1 | 6/2015 | Quam et al. |
| 2015/0163945 A1 | 6/2015 | Barton et al. |
| 2015/0186497 A1 | 7/2015 | Patton et al. |
| 2015/0237470 A1 | 8/2015 | Mayor et al. |
| 2015/0271638 A1 | 9/2015 | Menayas et al. |
| 2015/0301543 A1 | 10/2015 | Janoso et al. |
| 2015/0338116 A1 | 11/2015 | Furuta et al. |
| 2015/0370272 A1 | 12/2015 | Reddy et al. |
| 2015/0372832 A1 | 12/2015 | Kortz et al. |
| 2016/0007156 A1 | 1/2016 | Chiou et al. |
| 2016/0012411 A1* | 1/2016 | Kursun ............. G06Q 20/3221 705/42 |
| 2016/0054865 A1 | 2/2016 | Kerr et al. |
| 2016/0057572 A1 | 2/2016 | Bojorquez et al. |
| 2016/0078417 A1* | 3/2016 | DeLuca ............. G06Q 20/1085 701/23 |
| 2016/0142872 A1 | 5/2016 | Nicholson et al. |
| 2016/0223998 A1 | 8/2016 | Songkakul et al. |
| 2017/0026506 A1 | 1/2017 | Haepp et al. |

FOREIGN PATENT DOCUMENTS

| | | |
|---|---|---|
| CN | 103175287 A | 6/2013 |
| CN | 104704863 A | 6/2015 |
| CN | 105318499 A | 2/2016 |
| DE | 102013226390 A1 | 6/2015 |
| EP | 1515289 | 3/2005 |
| EP | 2607802 EP | 6/2013 |
| EP | 2675195 A2 | 12/2013 |
| EP | 3001116 A1 | 3/2016 |
| JP | 2011203841 A | 10/2011 |
| JP | 2012109680 A | 6/2012 |
| MX | 2012000906 | 9/2012 |
| WO | 2006055334 A1 | 5/2006 |
| WO | WO 2009/034720 | 3/2009 |
| WO | WO 2009/036764 | 3/2009 |
| WO | WO 2009/067251 | 5/2009 |
| WO | WO 2011/011404 | 1/2011 |
| WO | 2011121299 A1 | 10/2011 |
| WO | WO 2012/000107 | 1/2012 |
| WO | 2012068517 A1 | 5/2012 |
| WO | WO 2013/170791 | 11/2013 |
| WO | WO 2014/016705 | 1/2014 |
| WO | WO 2014/047501 | 3/2014 |
| WO | 2014055939 A1 | 4/2014 |
| WO | WO 2014/144323 | 9/2014 |
| WO | 2014200524 A2 | 12/2014 |
| WO | WO 2014/197320 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

"Petition for Inter Partes Review of U.S. Pat. No. 8,571,518 Pursuant to 35 U.S.C. 311-319, 37 CFR 42," Inventor Imes et al., dated Oct. 29, 2014.

Do, "Programmable Communicating Thermostats for Demand Response in California," DR ETD Workshop, 26 pages, Jun. 11, 2007.

Green, "PM's Thermostat Guide," Popular Mechanics, pp. 155-158, Oct. 1985.

Gupta et al., "Adding GPS-Control to Traditional Thermostats: An Exploration of Potential Energy Savings and Design Challenges," Pervasive, LNCS 5538, pp. 95-114, 2009.

Gupta, "A Persuasive GPS-Controlled Thermostat System," 89 pages, Sep. 2008.

http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.

http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.

http://www.allure-energy.com/aenf_jan9_12.html, "CES Gets First Look at EverSense," Allure Energy, 2 pages, printed Feb. 17, 2015.

http:/IWww.prnev.tswire.com/nev.ts-releases/allure-energy-un-veils-a-combination-of-ibeacon-and-nfc-enabled-smart-sensor-technology-known-as-aura-23885 . . . , "Allure Energy Unveils Combination of iBeacon and NFC Enabled Smart Sensor Technology Known as Aura," 6 pages, Jan. 6, 2014.

Mobile Integrated Solutions, LLC, "MobiLinc Take Control of Your Home, MobiLinc and Geo-Fence Awareness," 9 pages, downloaded Mar. 27, 2015.

Pan et al., "A Framework for Smart Location-Based Automated Energy Controls in a Green Building Testbed," 6 pages, downloaded Jan. 30, 2015.

SmartThings Inc., "2 Ecobee Si Thermostat + Geofencing," 17 pages, downloaded Nov. 3, 2014.

U.S. Appl. No. 14/640,984, filed Mar. 6, 2015.
U.S. Appl. No. 14/668,800, filed Mar. 25, 2015.
U.S. Appl. No. 14/696,662, filed Apr. 27, 2015.
U.S. Appl. No. 14/696,725, filed Apr. 27, 2015.
U.S. Appl. No. 14/933,948, filed Nov. 5, 2015.
U.S. Appl. No. 14/938,595, filed Nov. 11, 2015.
U.S. Appl. No. 14/938,642, filed Nov. 11, 2015.
U.S. Appl. No. 14/964,264, filed Dec. 9, 2015.
U.S. Appl. No. 14/964,349, filed Dec. 9, 2015.

Extended European Search Report for EP Application No. 16196128.9, dated Mar. 7, 2017.

Extended European Search Report and Opinion for EP Application No. 16156760.7-1862, dated Jul. 8, 2016.

Extended European Search Report for EP Application No. 1619416, dated Feb. 2, 2017.

Gentec, "Feature Focus, Threat Level Management," 2 pages, 2013.

Scanlon et al., "Mutual Information Based Visual Feature Selection for Lipreading," 8th International Conference on Spoken Language Processing, 5 pages, Oct. 4-8, 2004.

Transportation Research Board of the National Academies, "Commuting in America III, The Third National Report on Commuting Patterns and Trends," 199 pages, 2006.

Allure Energy, "Our Technology," http://www.allure-energy.com/pages/about.jsp 1 page, printed May 30, 2012.

Extended European Search Report for EP Application No. 16195639.6, dated May 31, 2017.

International Search Report for PCT Application No. PCT/US2010/042589 dated Nov. 22, 2010.

Mozer, "The Neural Network House: An Environment that Adapts to Its Inhabitants," Department of Computer Science, University of Colorado, 5 pages, downloaded May 29, 2012.

U.S. Appl. No. 15/048,902, filed Feb. 19, 2016.

\* cited by examiner

SITE MANAGEMENT SYSTEM WITH DYNAMIC SITE THREAT LEVEL BASED ON GEO-LOCATION DATA

TECHNICAL FIELD

The disclosure relates generally to site or alarm management systems and more particularly to dynamically increasing a threat level of a site or alarm based on geo-location data from a mobile device.

BACKGROUND

Site security systems or alarm systems are often used to control or record access to a site or alert about potentially dangerous conditions at a site. For instance, a site may include one or more alarms tied to physical objects such as windows or doors that may communicate notifications when opened. Sites may also include motion detectors, cameras, and other security devices. Each of these alarms or devices may communicate data to a central location where a person may monitor the site devices and alarms. In some cases, a monitoring person may be responsible for monitoring many devices and alarms, sometimes across many different sites. To aid the monitoring person, it may be desirable to manage prioritization of the different devices, alarms, and/or sites, depending on a current threat level.

SUMMARY

The disclosure relates generally to site or alarm management systems and more particularly to dynamically increasing a threat level of a site or alarm based on geo-location data from a mobile device. In a first example, a site management system may include a user interface with a display, a network interface, and a controller coupled to the user interface and the network interface. In some instances, the controller may be configured to determine the location of a first machine and compare the location of the first machine to one or more second machines. In some cases, the first machine may be an automated teller machine (ATM) refilling vehicle and the second machine may be an ATM at a site. After determining that the first machine crosses a predetermined geo-boundary of the second machine (or visa-versa), the controller may be configured to elevate a threat level associated with the second machine. In response to increasing the threat level associated with the second machine, the site management system may prioritize information about the second machine and/or more generally the site of the second machine. In some cases, prioritize the information may include displaying certain information on a summary page or in some other prominent way on the display of the user interface of the site management system. In some cases, prioritize the information about the second machine and/or more generally the site of the second machine may include enabling some disabled sensors and/or alarm conditions of the second machine and/or site of the second machine.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative examples of the disclosure in connection with the accompanying drawings, in which.

Figure 1:
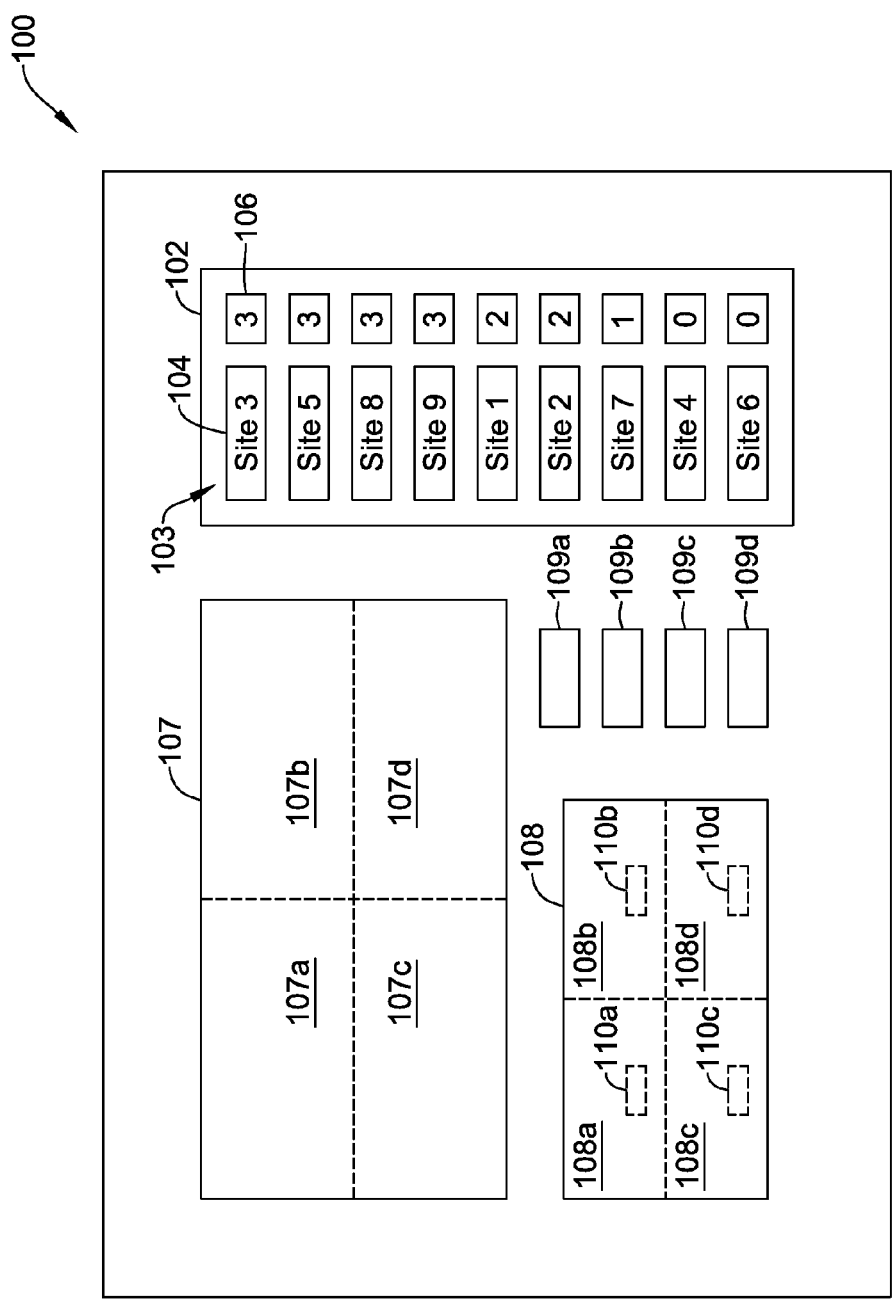
FIG. 1 is an exemplary display of a user interface of a site management system according to aspects of the present disclosure.

While the disclosure is amenable to various modifications and alternative forms, specifics thereof have been shown by way of example in the drawings and will be described in detail. It should be understood, however, that the intention is not to limit aspects of the disclosure to the particular illustrative examples described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an example", "some examples", "other examples", etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is contemplated that the feature, structure, or characteristic may be applied to other examples whether or not explicitly described unless clearly stated to the contrary.

The present disclosure is directed generally to site and/or alarm prioritization. For instance, a person at a central location may monitor multiple sites, alarms, and/or other devices for indications of intrusion or other dangerous conditions. The number of sites, alarms, and/or other devices, may be numerous enough that the monitoring person cannot effectively monitor all sites, devices, and/or alarms simultaneously. Accordingly, a method of prioritization of the sites, alarms, and/or other devices may help to identify which particular sites, alarms, and/or other devices should be currently monitored due to an increased likelihood of dangerous conditions at the site or at the locations of the alarms and/or other devices. A site management system may display the prioritized alarms, devices, and/or sites to the monitoring person via a user interface (e.g. one or more displays) to allow the monitoring person to more effectively monitor the often numerous alarms, devices, and/or sites.

FIG. 1 depicts an example display 100 of a user interface of a site management system that may be shown to a monitoring person. The user interface may be located at a central monitoring location. The illustrative site management system, described in more detail with respect to FIG. 5, may control display 100 and cause information to be displayed on display 100, for viewing by the monitoring person in order to monitor one or more sites, alarms, and/or other devices. Display 100 may include a computer monitor, television, or other display device that allows the monitoring person to visually monitor the sites, alarms, and/or other devices.

In some cases, display 100 may display site listing 102, with each site 103 including a site name 104 and a current perceived threat level 106. A site 103 may correspond to a particular building or location that the site management system has been tasked to monitor. Typically, each site 103 may include one or more sensors, alarms, and/or other devices to help monitoring the site 103. In at least some instances, a site 103 may further include one or more video cameras that can communicate video data to the site management system, and the site management system may cause the received video data to be displayed on display 100, as described in more detail below.

As shown in the example of FIG. 1, the site management system may cause sites 103 to be displayed to the monitoring person in site listing 102 in descending threat level order. However, this is not necessary. In at least some examples, the monitoring person may interact with display 100 to modify how information is displayed on display 100, including adjusting the ordering of sites 103 within site listing 102 in order to prioritize particular sites according to the monitoring person's needs.

In at least some examples, each of sites 103 displayed in site listing 102 can include information about various devices and alarms at each of sites 103. For instance, below each site name 104, a site 103 can include a listing of one of or more alarms or other devices and the status of those alarms or other devices. As one example, a site 103 can include a door alarm. Accordingly, the corresponding site 103 displayed in site listing 102 may further list a door alarm (not shown) in conjunction with site name 104 and threat level 106. Even further, the door alarm may also have a status indicated, such as whether the alarm has been armed, whether the alarm has been tripped, or any other status related to the door alarm. This is just one example.

It is contemplated that display 100 may further display a video feed region 107. The site management system may cause one or more video feeds from video camera(s) located at one or more sites 103 to be displayed in video feed region 107. In at least some examples, video feed region 107 may include sectors 107a-d, with each sector 107a-d displaying a video feed from a different site 103 and/or a different video camera of a particular site. For instance, where video feed region 107 includes four sectors 107a-d, the site management system may cause video feed to be displayed from four of sites 103 with the highest threat level. Of course, it is contemplated that video feed region 107 may include any number of sectors, with each sector displaying video from a different site with a high threat level. It is also contemplated that the site management system may include multiple displays, which in some cases, can be used to display additional video feed regions, if desired.

In some instances, each sector 107a-d may include two or more sub-sectors. Each of the sub-sectors may display video feeds from different video cameras located at a particular site 103. In this way, the monitoring person may monitor multiple video feeds from a single site 103 without having to switch between different camera feeds. In other examples, for instance where sectors 107a-d do not include sub sectors, each of sectors 107a-d may cycle through different video camera feeds of a given site 103 at regular or user adjusted intervals. In some cases, the site management system may record the various video feeds.

The site management system may process the video feeds and identify certain events in the video feed, such as (1) when the video feed includes a moving object in the field of view or a particular region of interest (ROI) of the field of view of the video camera; (2) when the video feed includes a particular object type in the field of view (e.g. car, person); (3) when the video feed captures an object (e.g. car, person, etc.) traveling along a particular predefined path in the field of view of the video camera; (4) when the video feed captures an object (e.g. person, car, etc.) loitering for more than a predefined time period in the field of view or a particular region of interest (ROI) of the field of view of the video camera; (5) when the video feed captures a pattern of a particular object (e.g. person, car, etc.) being in the field of view of the video camera (e.g. for an ATM video camera, when a particular car was in the field of view of the video camera during each of two or more times that ATM machine was refilled); and/or (6) any other suitable event. Upon detection of one of these events, the site management system may display the corresponding video feed on the display.

In some cases, the site management system may further cause display 100 to display site information. Site information region 108 may display additional site information about each site 103 for which the video feed is currently shown in video feed region 107. As some examples, information shown in site information region 108 can include a listing of sensors, alarms and/or other devices located at the site 103 and the status of the sensors, alarms and/or other devices. For instance, the site information may be similar to that displayed along with site name 104 in site listing 102 for each site 103. However, the display area in site listing 102 for each site 103 may be limited and therefor only information about a small number of sensors, alarms and/or other devices may be displayed proximate each site 103. In contrast, site information region 108 may include a larger display area and may therefore display information about a larger number of alarms and/or other devices and their statuses than displayed proximate each site 103.

In alternative or additional examples, site information region 108 may display other information about corresponding sites 103. Some example information can include an address of the site, emergency contact information for the site such as a manager or security personnel, and/or emergency services information, such as information detailing the location and/or contact information of the closest fire department, police station, hospital, or other emergency service to the particular site 103. It should be understood these are only examples. In general, any useful information about a site 103 may be displayed to the monitoring person in site information region 108.

In some instances, site information region 108 may include sectors 108a-d. Each of sectors 108a-d may display information about a different site 103, and in some cases the information may correspond to the sites 103 for which video feeds 107 are displayed in sectors 107a-d. In this manner, the monitoring person may not only view the video camera feeds for a given site 103, but the monitoring person may also view important information about the given site 103 in order to take quick and effective action when necessary.

In some cases, the number of sites 103 tied for having the highest threat level may be greater than the number of sectors 107a-d and 108a-d. In such cases, video feed from each site 103 (and information about each of the sites 103) may be displayed in sectors 107a-d and 108a-d in a rotating time-wise fashion.

Although shown in a single display in FIG. 1, in other examples the user interface may include multiple monitors, televisions, or other display devices. Accordingly, and in some cases, display 100 may span across multiple monitors, televisions, or other display devices, giving the monitoring person a larger area for visually assessing the various monitored sites, alarms, and/or other devices. In some cases, each individual monitor or other display device may display video feed and site information for a single site 103, but this is not required.

In some examples, the monitoring person may interact with display 100 to change one or more displayed features. For instance, the monitoring person may manually adjust the threat level 106 associated with each site 103. Manually adjusting a threat level of a site 103 may cause the site management system to re-sort sites 103 displayed in site listing 102 according to the new threat levels.

Additionally, or alternatively, the monitoring person may select one or more sites 103 to cause the site management system to display the video feeds from the selected sites 103 in video feed region 107 and further information for the selected sites 103 in site information region 108. A selected site 103 may continue to have its video feed and site information displayed in video feed region 107 and site information region 108 for a predetermined period of time, such as until one or more threat levels 106 of a non-selected site 103 changes (for instance a threat level 106 of a non-selected site 103 becomes or ties the current highest threat level value), or until the monitoring person deselects the selected site 103.

In at least some examples, the display 100 may include action buttons 109a-d. In some cases, action buttons 109a-d may be pressed or selected by a monitoring person in order to cause some action to be taken. Some example actions include recording the video feed displayed in one of sectors 107a-d, calling a manager or security personnel of one of the sites 103 associated with the information displayed in one of sectors 108a-d, calling an emergency service number associated with one of the sites 103 for which information is displayed in site information sectors 108a-d, changing the camera feed displayed in one of sectors 107a-d for a given site 103 to another camera feed of the given site 103, and/or perform some other action.

Display 100 may further include action buttons 110a-d. Action buttons 110a-d may be associated with a specific alarm or other device displayed in site information sectors 108a-d. When selected, action buttons 110a-d may cause the site management system to take one or more actions related to the action button's associated alarm or other device. For instance, where one of action buttons 110a-d is associated with an alarm, selecting the action button may cause the site management system to trip the alarm, if the alarm is currently not-tripped, or to silence the alarm, if the alarm if the alarm had been tripped. Where one of the action buttons 110a-d is associated with a door lock, selecting the action button may cause the site management system to lock or unlock the lock, depending on the current state of the lock. Where one of the action buttons 110a-d is associated with a machine, selecting the action button may cause the site management to disable or enable the machine, depending on the current state of the machine. Of course, these are just examples. Where still other types of devices are located at a site 103, selecting one of action buttons 110a-d associated with those other types of devices may cause the site management system to take other actions in relation to those devices.

Figure 2:
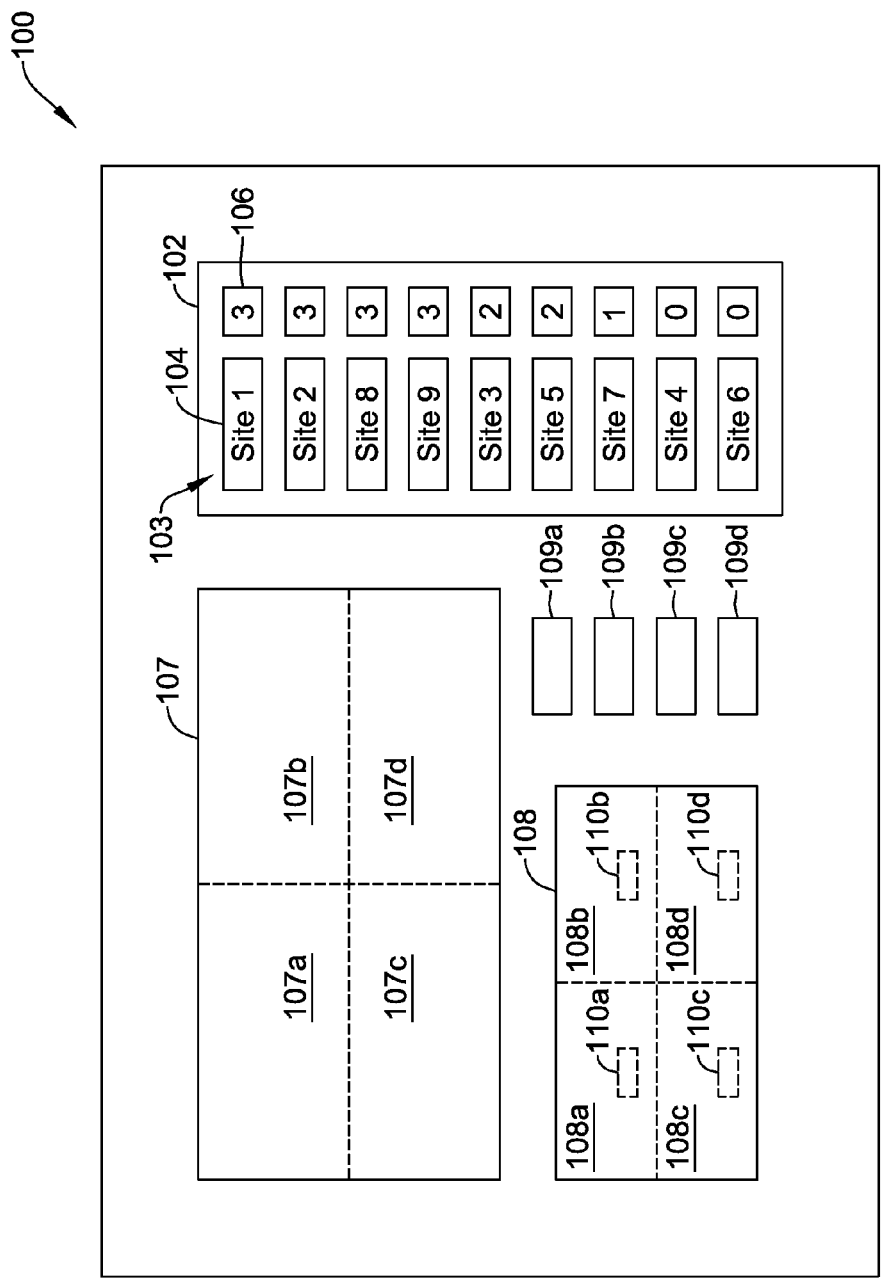
FIG. 2 is another exemplary display showing features of the display of FIG. 1 in a different order.

The site management system may cause the threat levels 106 associated with sites 103 to dynamically increase or decrease depending on one or more factors. In at least some examples, after dynamically adjusting one or more threat levels, the site management system may re-sort the sites 103 displayed in site listing 102 according to the new threat level or levels. For instance, FIG. 2 shows what display 100 may look like after the site management system has dynamically adjusted the threat levels 106 of multiple sites 103 from their values as seen in FIG. 1. As can be seen in FIG. 1, sites '3', '5', '8', and '9' all have threat levels 106 of '3', while sites '1' and '2' have threat levels 106 of '2'. However, in FIG. 2, sites '1' and '2' have increased threat levels 106 of '3', while sites '5' and '3' have decreased threat levels 106 of '2'.

In some examples this re-ordering of sites 103 listed in listing of sites 102 may cause information displayed in video feed region 107 and site information region 108 to change as well. For example, in FIG. 1, the site management system may cause video feed region 107 to display live video feeds from sites '3', '5', '8', and '9', which have the highest threat level 106 values, in sectors 107a-d and information about sites '3', '5', '8', and '9' in site information sectors 108a-d. However, in FIG. 2, the site management system may cause video feed region 107 to display live video feeds from sites '1', '2', '8' and '9', which have the highest threat level 106 values, in sectors 107a-d and information about sites '1', '2', '8', and '9' in site information sectors 108a-d.

In other examples, instead of displaying video feed and information about the sites 103 with the highest threat levels 106 at video feed region 107 and site information region 108, the site management system may cause display 100 to display video feed and information about the first four sites 103 displayed at site listing 102. For instance, in some examples, a monitoring person may manually place a site 103 within the top four sites shown in site listing 102. In some cases, the manually placed site 103 may stay in the first four displayed sites until, for example, a threat level 106 associated with another, non-manually placed site 103 reaches the value of the threat level 106 of a site 103 that is one of the first four sites displayed at site listing 102. Alternatively, the manually placed site 103 may stay in the first four displayed sites for a predetermined amount of time, or until the monitoring person manually places the site 103 outside of the first four displayed sites. This may provide the monitoring person with more control of which sites 103 the monitoring person is currently viewing even while the site management system is dynamically adjusting the threat levels 106 of the sites 103. It should also be understood that the number "four" was used as an example only, as it aligns with the described sectors 107a-d and 108a-d. In other examples, where display 100 may display more than four video feeds and site information, the number of sites with displayed video feed and site information may be greater or less than four.

Figure 3:
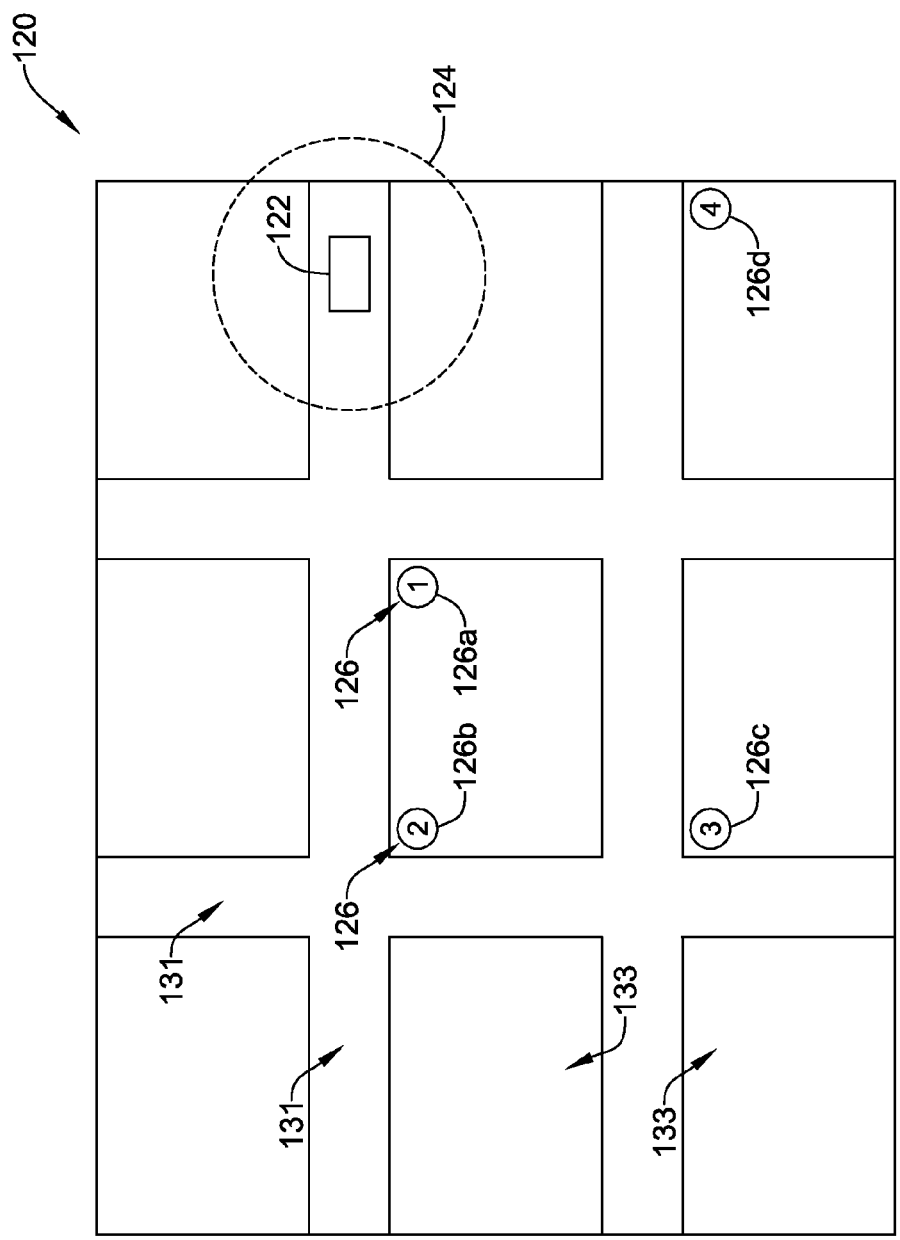
FIG. 3 is a view of an exemplary map including a mobile object and a number of sites on the map with a geo-boundary defined about the mobile object.
Figure 4:
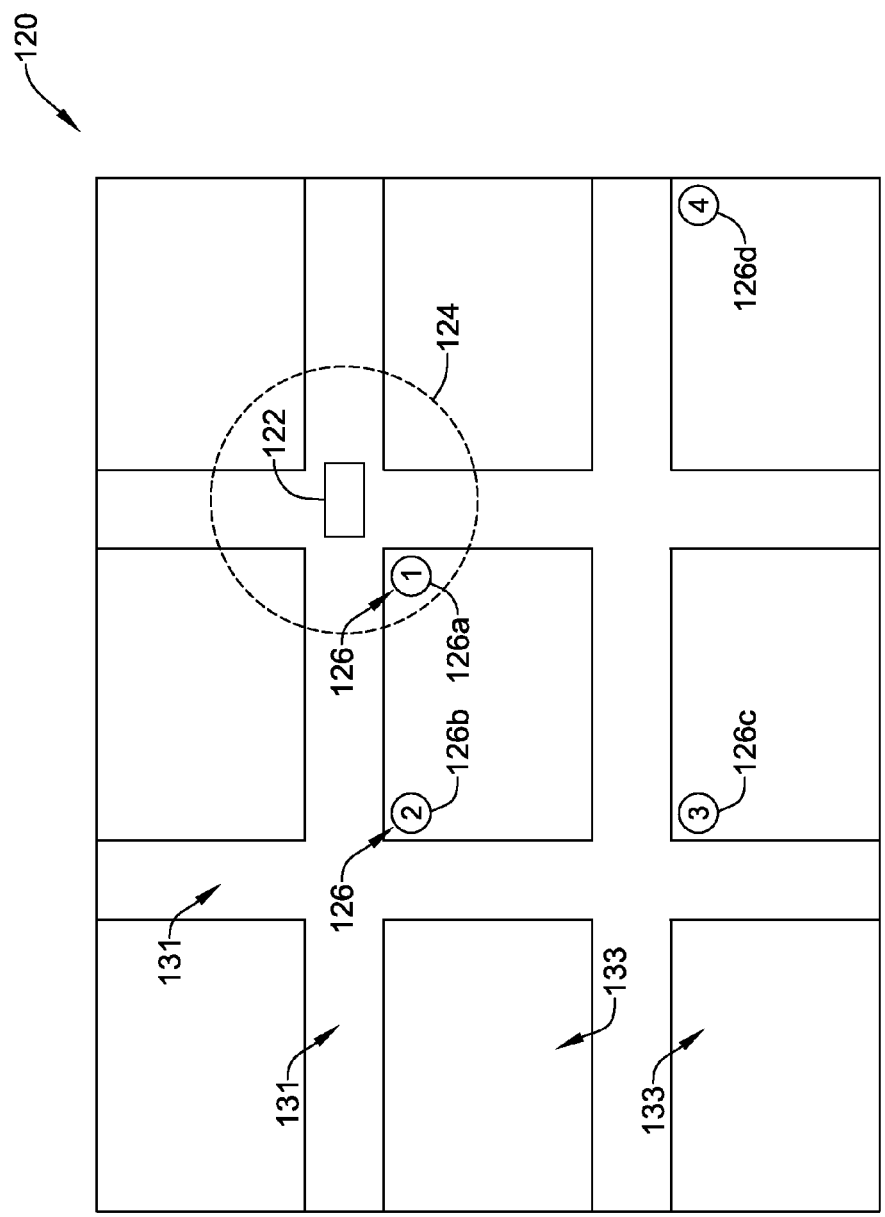
FIG. 4 is a view of the exemplary map of FIG. 3 with a site disposed within a geo-boundary of the mobile object.

FIGS. 3 and 4 depict an example method that the site management system may use to dynamically adjust the threat levels 106 of the sites 103. In the examples of FIGS. 3 and 4, the site management system uses a geo-boundary defined about a mobile object in order to dynamically adjust threat levels 106 of the various sites 103.

Figure 5:
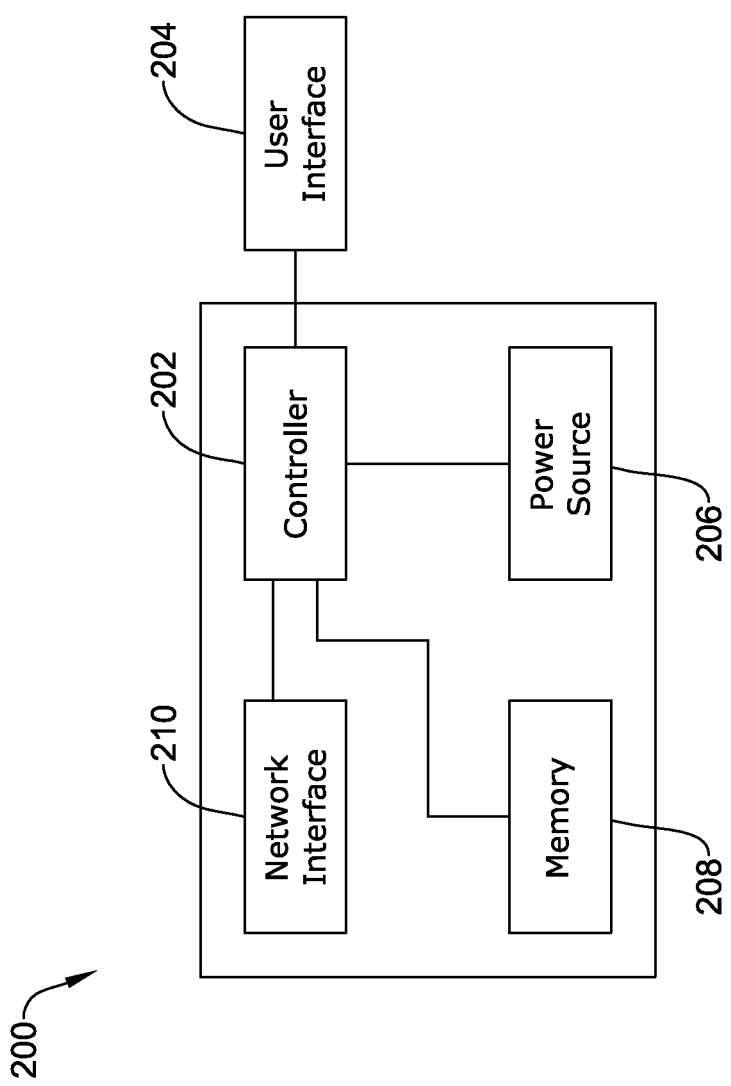
FIG. 5 is a schematic view of an illustrative site management system.

FIG. 5 depicts an example schematic of site management system 200. In some examples, site management system 200 may include a controller 202 and a user interface 204 connected to controller 202. Generally, controller 202 may be configured to control site management system 200. In some cases, controller 202 may control user interface 204 and cause displays 100 as shown in FIGS. 1 and 2 to be displayed on one or more display devices of user interface 204. In some cases, controller 202 may dynamically adjust the threat level 106 of sites 103, as disclosed herein.

Controller 202 may include a programmable microprocessor such as a central processing unit (CPU) or the like. Such a programmable microprocessor may allow a monitoring person to adjust the control logic of controller 202, allowing for flexibility of site management system 200 in how site management system 200 dynamically adjusts the threat levels 106 of the sites 103. In at least some examples, controller 202 may not be a single component. For example, controller 202 may include multiple components positioned at disparate locations within site management system 200 in order to perform the various described functions. For example, certain functions may be performed in one component of controller 202, while other functions may be performed in a separate component of controller 202. In some cases, the controller 202 may be implemented as a server.

Site management system 200 may include a power source 206 connected to controller 202. Power source 206 may generally include a power supply configured to condition received power into a form suitable for use by controller 202. In some cases, power source 206 may additionally condition power and supply the conditioned power to other components of site management system 200. In some cases, power source 206 includes a battery backup power source.

Site management system 200 may further include a memory 208, and controller 202 may store information on, and read information from, the memory 208. In some cases, memory 208 may store information related to one or more of sites 103. For instance, memory 208 may store site information for each of sites 103, of which controller 202 may cause to be displayed at display 100. In some cases, memory 208 may store global positioning system (GPS) data for each site 103, such as a specific set of GPS coordinates location of each site, and/or a geo-boundary based on a set of GPS coordinates denoting location of each site 103.

In some cases, controller 202 may include an internal memory circuit that controller 202 may store information on, and read information from. In these examples, site management system 200 may not include a separate memory 208 from the internal memory of controller 202. Memory 208, and/or the internal memory of controller 202, may be volatile memory, non-volatile memory, or a combination of volatile memory and non-volatile memory. In some cases, the memory 208 may include a hard drive, an optical memory, a Random Access Memory (RAM), and/or any other suitable memory as desired.

In addition to one or more display devices, user interface 204 may include one or more input devices, such as a keyboard, mouse, and/or trackpad. In some cases, the display device(s) may also function as an input device(s), such as where the display device(s) is a touch-screen device(s). Through one or more of these input devices, the monitoring person may interact with site management system 200 in order to change the information displayed on the display device(s) of user interface 204 and/or to effect one or more actions allowed by site management system 200.

Site management system 200 may further include a network interface 210. Network interface 210 may allow controller 202 to communicate and receive information over a network. In some examples, network interface 210 may be specific to a particular network, such as a cellular telephony or data network, a Wi-Fi network, or other wide area or local area networks. In at least some examples, network interface 210 may allow controller 202 to communicate and receive information over the internet. In still other examples, network interface 210 may allow controller 202 to communicate with remote devices over multiple types of networks (e.g. Internet and cellular telephony).

Figure 6:
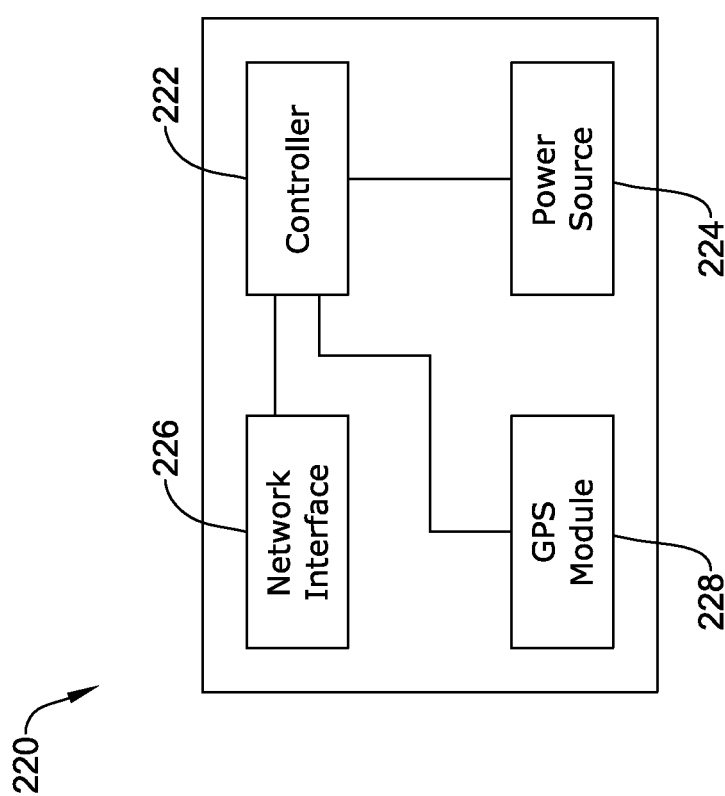
FIG. 6 is a schematic view of an illustrative mobile object.

FIG. 6 depicts a schematic of an example mobile object 220. Mobile object 220 may include a controller 222, a power source 224, a network interface 226, and a location services module. The location services module may identify the location of the mobile object 220, such as via cell tower triangulation, via the Global Positioning System (GPS) and/or any other suitable technique. In some cases, the location services module includes a GPS module 228 as shown in FIG. 6.

Power source 224 may include any suitable power source, which in some cases includes a power storage device to power mobile object 220. In some examples, power source 224 may be a non-rechargeable lithium-based battery. In other examples, the non-rechargeable battery may be made from other suitable materials. In still other examples, power source 224 may include a rechargeable battery. In still further examples, power source 224 may include other types of energy storage devices such as a capacitor, fuel cell, atomic battery, and/or any other suitable power source, as desired.

Network interface 226 may allow controller 222 to communicate and receive information over a network. In this manner, controller 222 may communicate information to, and/or receive information from, controller 202 of site management system 200.

In the example shown, GPS module 228 may be able to communicate with the global positioning system (GPS) to determine a location of mobile object 220. For instance, GPS module 228 may be able to receive or determine a set of GPS coordinates of mobile object 220 at regular intervals or when requested by controller 222.

Controller 222 may be programmed to cause GPS module 228 to receive or generate a set of GPS coordinates denoting the location of mobile object 220. In some cases, controller 222 may communicate the set of GPS coordinates through network interface 226 in order to communicate the coordinates to controller 202 of the site management system 200. The controller 202 of the site management system 200 may use the GPS coordinates to dynamically adjust threat levels 106 of sites 103 as further described herein.

Rather than delivering the GPS coordinates to the site management system 200, it is contemplated that the controller 222 of the mobile object 220 may compare the locally generated GPS coordinates (via the GPS module 228) with the locations of the one or more sites 103. The locations of the one or more sites 103 may be communicated to the mobile object 220 by the controller 202 of the site management system 200. The controller 222 of the mobile object 220 may then notify the controller 202 of the site management system 200 when it is appropriate to dynamically adjust threat levels 106 of sites 103.

In some examples, mobile object 220 may include a mobile device such as a cellular phone device. In some cases, mobile object 220 may include or be attached to a vehicle such as a car or truck. In some specific examples, mobile object 220 may be attached to an automated teller machine (ATM) refilling vehicle or machine. ATM refilling vehicles or machines may traverse between different ATMs carrying currency. Operators of the vehicle or machine operators may use the carried currency to refill the visited ATMs. It should be understood, though, that this is just one example of mobile object 220. In general, mobile object 220 may include any mobile object as desired.

Referring back to FIGS. 3-4, which illustrates one example of how site management system 200 may operate to dynamically adjust threat levels 106 of one or more sites 103. FIG. 3 depicts an example map 120 showing a number of roads 131 and buildings 133. FIG. 3 further depicts sites 126, denoted individually by reference numbers 126a-d, which each may correspond to a site shown at display 100 in FIGS. 1 and 2. FIG. 3 also shows mobile object 122, along with a corresponding defined geo-boundary 124.

In some cases, site management system 200 may store geo-boundary 124. For instance, mobile object 122, which may be similar to mobile object 220 described with respect to FIG. 6, may communicate a set of GPS coordinates of mobile object 122 to site management system 200. After receiving the a set of GPS coordinates of mobile object 122, site management system 200 may determine geo-boundary 124 around the current location of the mobile object 122, for instance based on a predetermined radius or other stored parameter(s). As mobile object 122 moves, mobile object 122 may continue to send updated sets of GPS coordinates to site management system 200, and site management system 200 may continue to update geo-boundary 124 so that geo-boundary 124 stays centered on mobile object 122.

Site management system 200 may further determine whether a location of one or more sites 126a-d falls within the geo-boundary 124. As mentioned previously, site management system 200 may store sets of GPS coordinates of monitored sites in memory 208, or another memory of site management system 200. Site management system 200 may use these stored sets of GPS coordinates to determine whether the set of GPS coordinates of one or more of the monitored sites falls within geo-boundary 124.

One example of how site management system 200 may determine whether a set of GPS coordinates of one or more of the monitored sites falls within geo-boundary 124 may include site management system 200 first determining the current location and extent of geo-boundary 124. In some cases, site management system 200 may then determine a range of GPS coordinates that fall within the determined geo-boundary 124. As site management system 200 receives updated sets of GPS coordinates from mobile object 122, site management system 200 may update the location of geo-boundary 124 and the range of coordinates that fall within geo-boundary 124. Site management system 200 may then compare the set of GPS coordinates of the monitored sites, e.g. sites 126a-d in FIGS. 3-4, to determine when any of the sets of coordinates of the monitored sites fall within the stored ranges of GPS coordinates encompassed by geo-boundary 124.

In another example of how site management system 200 may determine whether a location of a monitored site falls within site management system 200, site management system 200 may compute distances based on the stored set of GPS coordinates of the monitored sites and the received set of GPS coordinates from mobile object 122. Based on these two sets of GPS coordinates, site management system 200 may determine a distance between the monitored sites, e.g. sites 126a-d in FIGS. 3-4, and mobile object 122. Site management system 200 may determine that one or more of the monitored sites falls within geo-boundary 124 if any of these determined distances is less than or equal to a threshold distance.

In some cases, the location of the monitored sites, e.g. sites 126a-d in FIGS. 3-4, may be transmitted to the mobile object 122. The mobile object may then determine if one or more of the sites falls within the determined geo-boundary 124. The mobile object 122 may then notify the site management system 200 when and which one of the one or more of the sites enters the geo-boundary 124. Since the location of the mobile object 122 need not be continually transmitted to the site management system 200, this embodiment may help reduce the amount of communication that is required between the mobile object 122 and the site management system 200.

FIG. 4 depicts an example where mobile object 122 has moved such that site 126a now falls within the defined geo-boundary 124. Once site management system 200 (or mobile object 122) has determined that site 126a falls within geo-boundary 124, site management system 200 may dynamically adjust the threat level 106 associated with site 126a. For example, site management system 200 may dynamically increase the threat level 106 of site 126a. In some examples, site management system 200 may increase the threat level 106 of site 126a by one level, two levels, three levels, or any other suitable number of levels. Although FIG. 4 only depicts a single site 126a disposed within geo-boundary 124, it should be understood that site management system 200 may dynamically adjust the threat level 106 associated with any site that falls within geo-boundary 124, including situations where multiple sites 126a-d fall within geo-boundary 124.

In some cases, after dynamically adjusting the threat level 106 associated with site 126a, site management system 200 may re-sort the sites displayed in a site listing portion of a display, such as sites 103 displayed in site listing 102 of display 100. Accordingly, site management system 200 may also adjust information displayed at the display based on the re-sorted site listing. For example, as described with respect to FIG. 1, site management system 200 may cause video feed(s) or other information about a site to be more prominently displayed at the display. In this manner, site management system 200 may assist a monitoring person viewing the display and monitoring various different sites by drawing attention to sites in proximity to the mobile object 122. This may be particularly useful where the mobile object is, for example, an ATM refilling vehicle or machine, where the monitoring person can more closely monitor the ATM when the ATM refilling vehicle or machine is approaching.

In some instances, site management system 200 (or mobile object 122) may determine when a site has left a geo-boundary of a mobile object 122. For instance, along with determining when a site, such as sites 126a-d of FIGS. 3-4, enter geo-boundary 124 of mobile object 122, site management system 200 (or mobile object 122) may determine when one or more of sites 126a-d leaves the geo-boundary 124. After site management system 200 (or mobile object 122) has determined that one or more of sites 126a-d have left the geo-boundary 124, site management system 200 may dynamically adjust the threat level 106 associated with the one or more of sites 126a-d that have left geo-boundary 124. For example, site management system 200 may dynamically decrease the threat level 106 of the sites that have left geo-boundary 124. In some cases, site management system 200 may decrease the threat level 106 of the sites that have left geo-boundary 124 by one level, two levels, three levels, or any other suitable number of levels. In some further examples, site management system 200 may maintain the current threat level 106 of the sites that have left geo-boundary 124 for a predetermined period of time before dynamically adjusting the threat levels 106 of the sites that have left geo-boundary 124.

Although each site 126a-d may be associated with a single set of GPS coordinates denoting the location of the sites 126a-d, it is contemplated that each site 126a-d may be associated with multiple sets of GPS coordinates denoting the location of sites 126a-d. For example, sites 126a-d may cover a geographical area or region such that associating multiple sets of GPS coordinates enhances the ability of site management system 200 to determine when mobile object 122 is approaching one or more of sites 126a-d and falls within geo-boundary 124. In such examples, site management system 200 (or mobile object 122) may determine whether any of the sets of GPS coordinates associated with each site 126a-d enters geo-boundary 124 of mobile object 122, and may dynamically adjust the threat levels 106 of sites 126a-d if any of the sets of GPS coordinates associated with the sites 126a-d enters geo-boundary 124 of mobile object 122.

Figure 7:
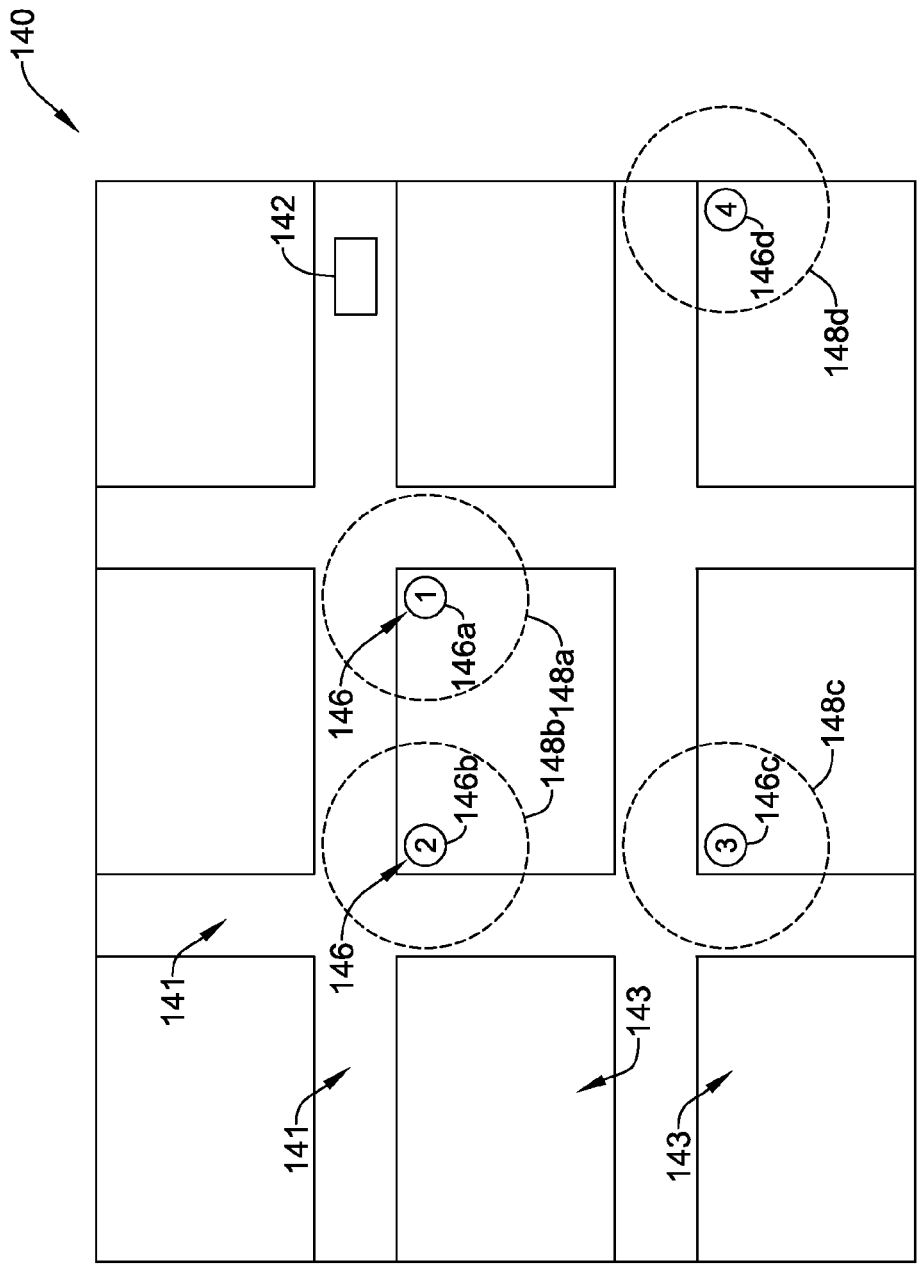
FIG. 7 is a view of an exemplary map including a mobile object and a number of sites on the map with geo-boundaries defined about each of the sites.
Figure 8:
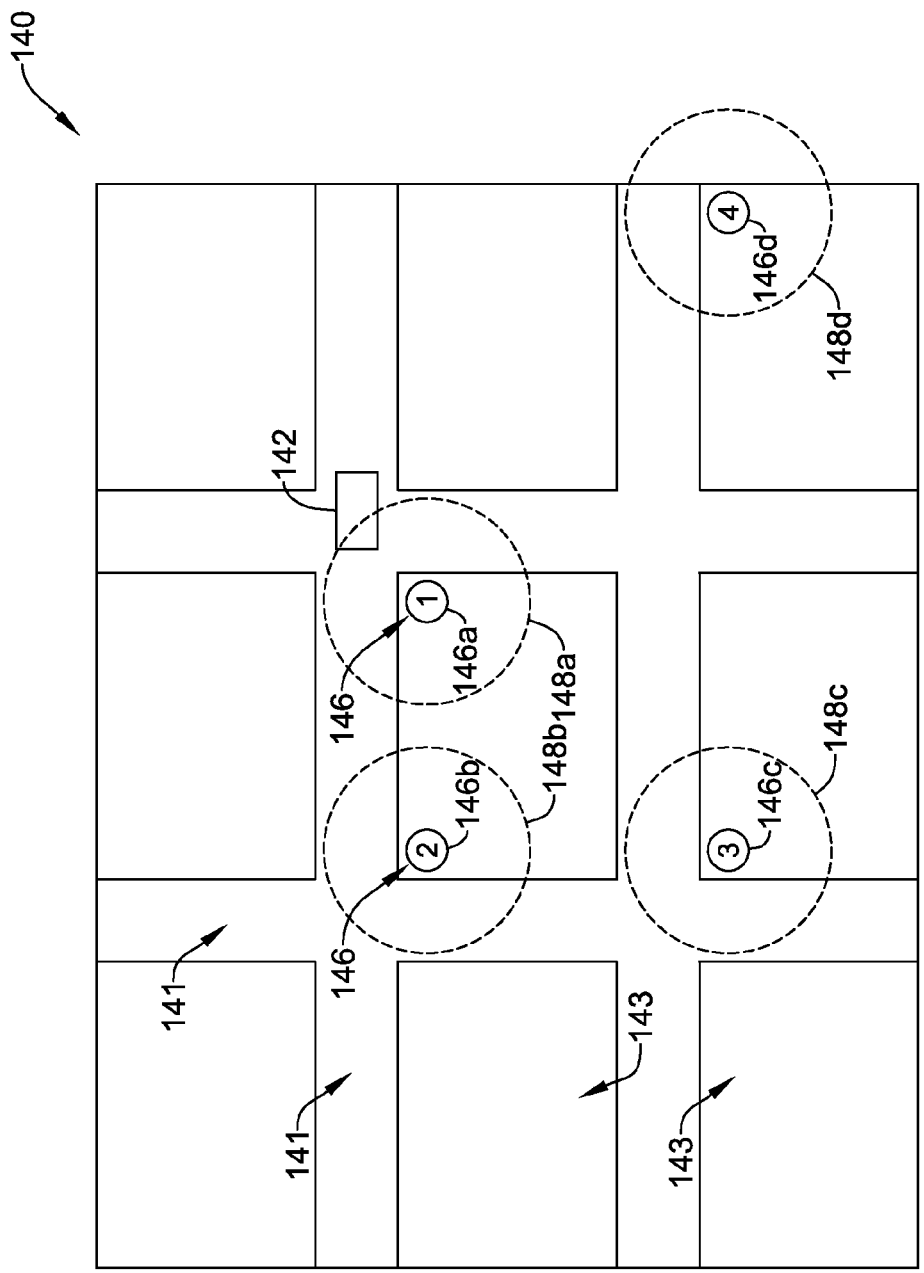
FIG. 8 is a view of the exemplary map of FIG. 4 with the mobile object disposed within a geo-boundary of one of the sites.

FIGS. 7 and 8 illustrate another example of how site management system 200 may operate to dynamically adjust threat levels 106 of one or more sites 103. FIG. 7 depicts example map 140 showing a number of roads 141 and buildings 143 and a mobile object 142. FIG. 7 further depicts sites 146, denoted individually by reference numbers 146a-d, which may each correspond to a site shown on display 100 in FIGS. 1 and 2. FIG. 7 also shows geo-boundaries 148a-d associated with each of sites 146a-d, respectively.

In the example of FIGS. 7-8, site management system 200 may determine individual geo-boundaries 148a-d for each of sites 146a-d, sometimes referred to as geo-fences, as opposed to the geo-boundary of mobile object 142 discussed above. FIG. 7 depicts a mobile object 142 outside of all shown geo-boundaries 148a-d, and FIG. 8 depicts a mobile object 142 within geo-boundary 148a.

Site management system 200 (or mobile object 122) may determine when mobile object 142 enters one or more of geo-boundaries 148a-d. For instance, and in one example, mobile object 142 may communicate current sets of GPS coordinates of mobile object 142 to site management system 200. Site management system 200 may then determine whether the current set of GPS coordinates for mobile object 142 falls within any of geo-boundaries 148a-d.

In one example of how site management system 200 determines when mobile object 142 enters one of geo-boundaries 148a-d, site management system 200 may have stored a set of GPS coordinates associated with each of sites 146a-d, for instance in memory 208 or another memory of site management system 200. Site management system 200 may then determine distances between mobile object 142 and each of sites 146a-d. If any of the determined distances is less than or equal to a predetermined threshold, site management system 200 may determine that the mobile object 142 is within at least one of geo-boundaries 148a-d.

In another example, site management system 200 may determine and store ranges of GPS coordinates surrounding each set of GPS coordinates that denote the location of each of sites 146a-d. As site management system 200 receives updated sets of GPS coordinates from mobile object 142, site management system 200 may compare the updated set of GPS coordinates for mobile object 142 with the stored ranges of GPS coordinates for each of sites 146a-d to determine if the set of GPS coordinates of mobile object 142 falls within any of the stored ranges of GPS coordinates for each of sites 146a-d. If the set of GPS coordinates for mobile object 142 does fall within any of the stored ranges of GPS coordinates for each of sites 146a-d, the site management system 200 may determine that mobile object 142 has entered at least one of geo-boundaries 148a-d.

In the specific example of FIGS. 7 and 8, site management system 200 (or mobile object 142) may determine that mobile object 142 has fallen within geo-boundary 148a of site 146a. Once it is determined that mobile object 142 has entered geo-boundary 148a, site management system 200 may dynamically adjust the threat level 106 associated with site 146a. For example, site management system 200 may dynamically increase the threat level 106 of site 146a. In some examples, site management system 200 may increase the threat level 106 of site 146a by one level, two levels, three levels, or any other suitable number of levels.

After dynamically adjusting the threat level 106 associated with site 146a, site management system 200 may re-sort the sites displayed in a site listing portion of a display, such as sites 103 displayed in site listing 102 of display 100. Site management system 200 may further cause changes to the information displayed at display 100 based on the re-sorting of sites 103 displayed in site listing 102, as described previously with respect to FIGS. 3-4.

Site management system 200 (or mobile object 142), in these examples, may further determine when mobile object 142 has left one or more of geo-boundaries 148a-d. For instance, site management system 200 (or mobile object 142) may determine that mobile object 142 has left one or more of geo-boundaries 148a-d by determining that a distance between a set of stored GPS coordinates associated with sites 146a-d and the set of GPS coordinates of mobile object 142 has increased above the predetermined threshold, or by determining that the set of GPS coordinates of mobile object 142 no longer is within stored ranges of GPS coordinates for sites 146a-d.

After determining that mobile object 142 is no longer within one or more of geo-boundaries 148a-d, site management system 200 may dynamically decrease the threat level 106 of the associated sites 146a-d. In some examples, site management system 200 may decrease the threat level 106 of the associated sites 146a-d by one level, two levels, three levels, or any other suitable number of levels. In some further examples, site management system 200 may maintain the current threat level 106 of the associated sites 146a-d for a predetermined period of time before dynamically adjusting the threat levels 106 of the associated sites 146a-d.

Figure 9:
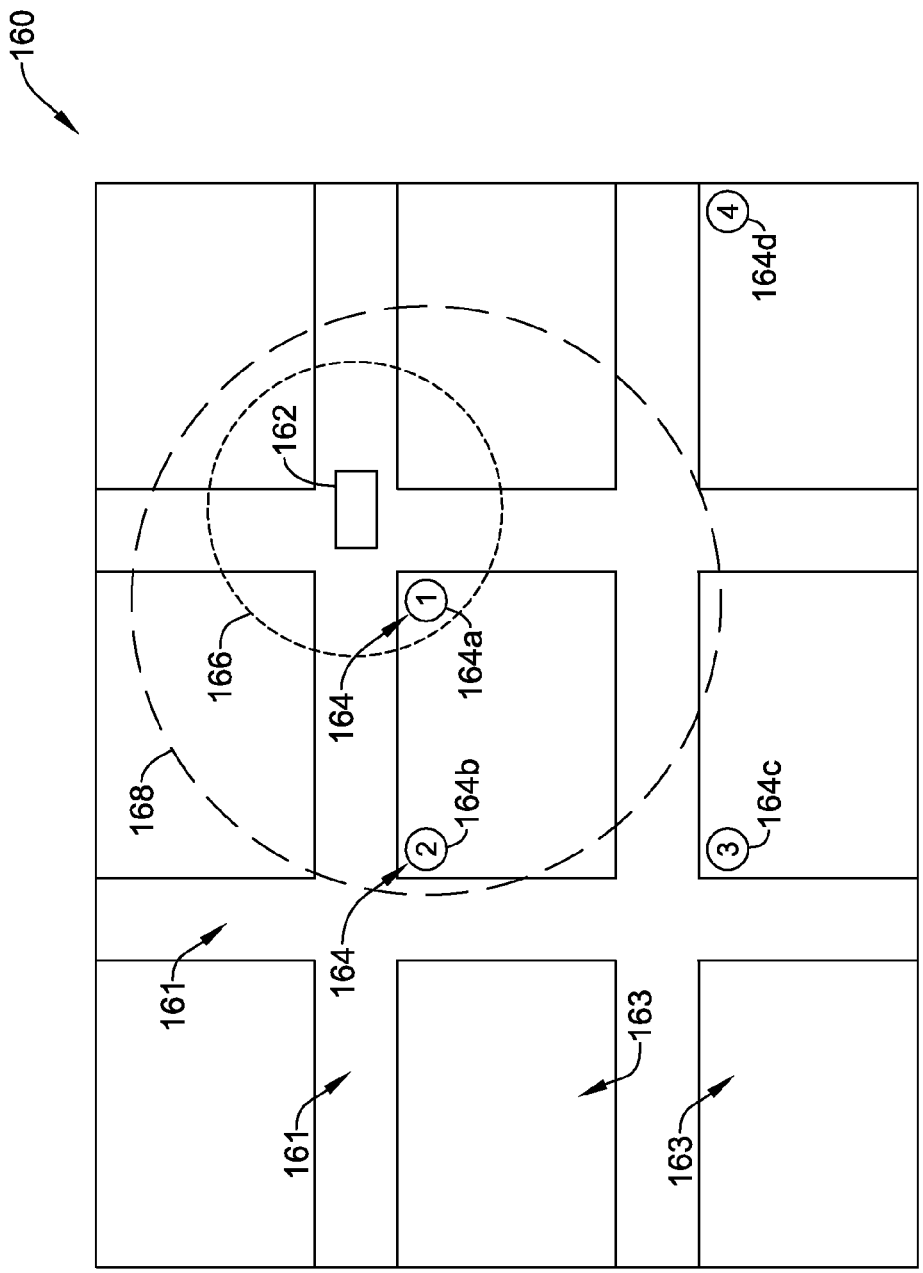
FIG. 9 is a view of an exemplary map including a mobile object and a number of sites on the map with geo-boundaries defined for both the mobile object and the sites.

FIG. 9 depicts another example of a method that site management system 200 may implement to dynamically adjust threat levels 106 of sites 103. Similarly to FIGS. 3-4 and 7-8, FIG. 9 depicts an example map 166 that includes streets 161 and buildings 163. FIG. 9 further depicts a mobile object 162 and sites 164, denoted individually by reference numbers 164*a-d*. In the example of FIG. 9, there are geo-boundaries defined for both mobile object 162 and sites 164*a-d*. In FIG. 9, and for simplicity, only one geo-boundary is shown centered on site 164*a*. However, there may be geo-boundaries defined for each of the sites 164*a-d*.

In the example of FIG. 9, once site management system 200 (or mobile object 122) has determined that, for example, site 164*a* has entered geo-boundary 166 of mobile object 162, site management system 200 may dynamically adjust the threat level 106 of sites 164*a* as described previously. Additionally however, site management system 200 may further dynamically adjust the threat level 106 of any of sites 164*b-d* that fall within geo-boundary 168 centered on site 164*a*. Accordingly, in the example of FIG. 9, site management system 200 may also dynamically adjust the threat level 106 of site 164*b*, as site 164*b* falls within geo-boundary 168 of site 164*a*.

When dynamically adjusting the threat level 106 of site 164*b*, site management system 200 may dynamically adjust the threat level 106 in the same manner as site management system 200 dynamically adjusts the threat level 106 of site 164*a*. For instance, site management system 200 may dynamically increase the threat level 106 of sites 164*a-b* the same amount. In other examples, however, site management system 200 may dynamically increase the threat level 106 of site 164*b* to a lesser extent than site management system 200 dynamically increases the threat level 106 of site 164*a*.

The exemplary techniques described with respect to FIG. 9 may be implemented in examples that don't include geo-boundary 166 centered on mobile object 162. For instance, there may be two geo-boundaries centered on each of sites 164*a-d*. Site management system 200 may employ a first geo-boundary for determining when a mobile object 162 enters the first geo-boundary and to dynamically adjust the threat level of the site associated with the first geo-boundary when this happens. Site management system 200 may employ a second geo-boundary for determining which sites' threat levels to dynamically adjust after determining when a mobile object 162 has entered the first geo-boundary.

In still other examples, the techniques described with respect to FIG. 9 may be implemented in examples that only include geo-boundaries such as geo-boundary 168, which are used to increase the threat level of neighboring sites within the geo-boundary when the threat level of a site upon which the geo-boundary is centered is increased. For instance, still using the example of FIG. 9, a monitoring person may manually increase the threat level of one of sites 164*a-d*, such as site 164*a*. In this example, site management system 200 may dynamically adjust the threat level of site 164*b*, as site 164*b* falls within geo-boundary 168 centered on site 164*a*. Alternatively, in some examples, an alarm or other device located at one of sites 164*a-d* may communicate a message to site management system 200 causing site management system 200 to automatically increase the threat level of the site associated with the alarm or other device. For instance, if a door sensor detects that a door has been opened, the sensor may communicate a message to site management system 200 causing site management system 200 to increase the threat level of the site associated with the door sensor. In examples including the techniques described with respect to FIG. 9, site management system 200 may also dynamically increase the threat levels of neighboring sites located within a geo-boundary centered on the site associated with the door sensor. In this manner, nearby sites to a site that has a threat level increase may be dynamically adjusted.

Further examples may include enhancements to the disclosed system and techniques. As one example, site management system 200 may track multiple mobile objects and dynamically adjust threat levels of sites based on the locations of all of the tracked mobile objects.

As another example, it is contemplated that the geo-boundaries may be shaped other than circles. For instance, any of the implemented geo-boundaries may be rectangular, triangular, oval-shaped, or any other suitable predetermined shape. In still further examples, one or more of the geo-boundaries may have no predefined shape, and may rather be defined based on user input, such as by entering sets of GPS coordinates as a boundary or by drawing a boundary on a map around a site, which site management system 200 converts to sets of GPS coordinates.

It should also be understood that even further examples of the present disclosure may implement the determining and/or comparing functions in different devices than described above. For instance, the examples described above discussed site management system 200 determining when a site has entered a geo-boundary centered on a mobile object or when a mobile object has entered a geo-boundary centered on a site. However, in alternative examples, and as discussed above, the mobile object may make this determination. In these examples, the mobile object may store sets or ranges of GPS coordinates in a memory of the controller of the mobile object, and compare sets of GPS coordinates received from a GPS module to determine when the mobile object or a site has entered a geo-boundary. In other examples, the mobile object may query site management system 200 or another device over a network interface of the mobile object in order to gather sets of GPS coordinates of sites before comparing the gathered sets of GPS coordinates to the set of GPS coordinates received from the GPS module of the mobile object.

After making this determination, the mobile object may send an indication to site management system 200, and site management system 200 may dynamically adjust threat levels of sites as described. Alternatively, the mobile object may send a communication indicating a threat level of a site, and site management system 200 may adjust the threat level of the indicated site to the receive value.

Although various features may have been described with respect to less than all examples, this disclosure contemplates that those features may be included on any example. Further, although the examples described herein may have omitted some combinations of the various described features, this disclosure contemplates examples that include any combination of each described feature. Accordingly, departure in form and detail may be made without departing from the scope and spirit of the present disclosure.

Those skilled in the art will recognize that the present disclosure may be manifested in a variety of forms other than the specific examples described and contemplated herein. For instance, as described herein, various examples include one or more modules or schematic components described as performing various functions. However, other examples may include additional modules or schematic components that split the described functions up over more modules or components than that described herein. Additionally, other examples may consolidate the described functions into fewer modules or components.

Additional Examples

In a first example, a site management system may include a user interface with a display device, a network interface, and a controller coupled to the user interface and the network interface. In some instances, the controller may be configured to determine the location of a first machine and compare the location of the first machine to one or more second machines. In some cases, the first machine may be an automated teller machine (ATM) refilling vehicle and the second machine may be an ATM. After determining the first machine crosses a predetermined geo-boundary of a second machine (or visa-versa), the controller may be configured to elevate a threat level associated with the second machine at the site management system.

Additionally, or alternatively, the controller may receive the location from the first machine through the network interface.

Additionally, or alternatively, in any of the examples described above with respect to the first example, the first machine may comprise a global positioning (GPS) device and a network interface.

Additionally, or alternatively, in any of the examples described above with respect to the first example, the first machine may communicate coordinates determined by the GPS device to the controller through the network interface.

Additionally, or alternatively, in any of the examples described above with respect to the first example, in response to elevating the threat level associated with the second machine, the controller may change information displayed at the display device to prioritize information relating to the second machine over at least one other machine.

Additionally, or alternatively, in any of the examples described above with respect to the first example, the controller may further comprise a memory, and the memory includes the location of the second machine.

Additionally, or alternatively, in any of the examples described above with respect to the first example, the first machine may be a vehicle.

Additionally, or alternatively, in any of the examples described above with respect to the first example, the first machine may be a portable device.

Additionally, or alternatively, in any of the examples described above with respect to the first example, the portable device may be a smart phone.

Additionally, or alternatively, in any of the examples described above with respect to the first example, the second machine may be an automated teller machine (ATM).

In a second example, a dynamically adjusting site prioritization system may comprise a user interface and a controller operatively coupled to the user interface. In some instances, the controller may be configured to dynamically increase a threat level associated with a site when a location of the site is within a predetermined geo-boundary of an object of interest. The controller may further be configured to, in response to increasing the threat level associated with the site, prioritize information about the site at the user interface.

Additionally, or alternatively, in any of the examples described above with respect to the second example, prioritizing information about the site at the user interface may comprise displaying one or more camera feeds of the site at the user interface.

Additionally, or alternatively, in any of the examples described above with respect to the second example, prioritizing information about the site at the user interface may comprise displaying one or more alarm statuses of the site prominently at the user interface.

Additionally, or alternatively, in any of the examples described above with respect to the second example, the controller may determine when a location of the site is within the predetermined geo-boundary of the object of interest by determining when the location of the object of interest enters a predetermined geo-boundary defined around the site.

Additionally, or alternatively, in any of the examples described above with respect to the second example, the controller may determine when a location of the site is within the predetermined geo-boundary of the object of interest by determining when the location of the site enters a predetermined geo-boundary defined around the object of interest.

Additionally, or alternatively, in any of the examples described above with respect to the second example, after increasing the threat level of a site, the controller may further be configured to increase the threat level associated with all sites within a predetermined geo-boundary of the site.

Additionally, or alternatively, in any of the examples described above with respect to the second example, the object of interest may be a vehicle, and wherein the vehicle may dynamically communicate a location of the vehicle to the controller.

Additionally, or alternatively, in any of the examples described above with respect to the second example, the site may comprise an automated teller machine (ATM).

In a third example, a method for dynamically increasing the threat level of a site may comprise using location based services data of a mobile device to determine when a distance between a location of a site and a location of the mobile object becomes less than a predetermined distance and, after determining that the distance between the location of the site and the location of the mobile object becomes less than the predetermined distance, dynamically increasing the threat level of the site. In some examples, the method may further comprise, in response to increasing the threat level at the site, prioritizing one or more security features that are available at the site for display on a user interface.

Additionally, or alternatively, in any of the examples described above with respect to the third example, determining when the distance between the location of the site and the location of the mobile object becomes less than the predetermined distance may comprise determining when the location of the site enters a predetermined geo-boundary defined around the mobile object or determining when the location of the mobile device enters a predetermined geo-boundary defined around the site.

What is claimed is:

1. A site management system comprising:
    a user interface comprising a display device;
    a network interface; and
    a controller coupled to the user interface and the network interface, the controller configured to:
        determine the location of a vehicle;
        compare the location of the vehicle relative to the location of one or more automated teller machines (ATM);
        after determining the vehicle crosses a predetermined geo-boundary of a particular ATM, elevate a threat level associated with the particular ATM, where elevating the threat level of the particular ATM includes:
            sending one or more control signals requesting security information associated with the particular ATM, the security information associated with the particular ATM including information from one or more sensors, motion detectors, alarms, cameras and/or other devices associated with the particular ATM;

sorting and prioritizing security information relating to the particular ATM over at least one other ATM; and displaying at least some of the received security information from the particular ATM on a larger display area of the display device of the site management system relative to the display area used for displaying security information of at least one other ATM.

2. The site management system of claim 1, wherein the controller receives the location from the vehicle through the network interface.

3. The site management system of claim 1, wherein the vehicle carries a global positioning (GPS) device and a network interface.

4. The site management system of claim 3, wherein the vehicle communicates coordinates determined by the GPS device to the controller through the network interface.

5. The site management system of claim 1, wherein the controller further comprises a memory, and the memory includes the location of the particular ATM.

6. The site management system of claim 1, wherein the vehicle carries a portable device that includes a global positioning (GPS) device and a network interface.

7. The site management system of claim 6, wherein the portable device is a smart phone.

* * * * *